United States Patent
Adams et al.

(10) Patent No.: US 7,620,830 B2
(45) Date of Patent: Nov. 17, 2009

(54) HALT STATE FOR PROTECTION OF HARD DISK DRIVES IN A MOBILE COMPUTING ENVIRONMENT

(75) Inventors: Stewart Lane Adams, Durham, NC (US); Matthew Brent Griffith, Raleigh, NC (US); Michael Scott Mettler, Durham, NC (US); Scott David Ruppert, Durham, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 546 days.

(21) Appl. No.: 11/479,307

(22) Filed: Jun. 30, 2006

(65) Prior Publication Data

US 2008/0005594 A1 Jan. 3, 2008

(51) Int. Cl.
*G06F 1/26* (2006.01)
(52) U.S. Cl. .......................... 713/323; 713/310; 714/34
(58) Field of Classification Search .................. 713/323, 713/310; 714/34
See application file for complete search history.

(56) References Cited

U.S. PATENT DOCUMENTS

| | | | |
|---|---|---|---|
| 5,175,853 A | 12/1992 | Kardach et al. | |
| 5,227,929 A | 7/1993 | Comerford | |
| 5,303,171 A * | 4/1994 | Belt et al. | 713/321 |
| 6,044,473 A * | 3/2000 | Kim | 713/320 |
| 6,193,422 B1 | 2/2001 | Belt et al. | |
| 6,222,393 B1 | 4/2001 | Shah et al. | |
| 6,240,521 B1 | 5/2001 | Barber et al. | |
| 6,243,819 B1 | 6/2001 | Jung | |
| 6,343,363 B1 | 1/2002 | Maher et al. | |
| 6,546,472 B2 | 4/2003 | Atkinson et al. | |
| 6,567,232 B1 | 5/2003 | Klaassen | |
| 6,760,851 B2 * | 7/2004 | Teshima et al. | 713/320 |
| 6,766,461 B1 | 7/2004 | Ando | |
| 6,920,593 B2 | 7/2005 | Hosokawa | |

* cited by examiner

*Primary Examiner*—Thuan N Du
(74) *Attorney, Agent, or Firm*—Yee & Associates

(57) ABSTRACT

A computer implemented method, apparatus, and computer usable program code for preventing operational shock to a hard disk drive of a mobile computer. An exemplary method includes, responsive to activation by a user of an activation device associated with the mobile computer, changing a state of the activation device. The exemplary method also includes, responsive to the change of state of the activation device, issuing a priority standby command to the hard disk drive.

19 Claims, 3 Drawing Sheets

HALT STATE FOR PROTECTION OF HARD DISK DRIVES IN A MOBILE COMPUTING ENVIRONMENT

BACKGROUND OF THE INVENTION

1. Field of the Invention

The present invention relates generally to an improved data processing system and in particular to a method, computer, and computer program product for physically protecting hard disk drives in mobile computers.

2. Description of the Related Art

One of the most common causes of failure of a hard disk drive in a mobile computer is operational shock. Operational shock occurs when a read/write head in the hard disk drive contacts a spinning platter, damaging the surface of the hard disk drive. Damage to the surface of the hard disk drive can cause bad sectors on the hard disk drive and can possibly cause the loss of data. The damage can also cause the entire hard disk drive to fail, possibly resulting in a disastrous loss of data.

Operational shock is a risk for any computer, but mobile computers, such as laptop computers, are especially vulnerable to operational shock. Every time a user picks up a mobile computer without completely shutting down the mobile computer or without waiting for the mobile computer to fully enter standby mode, the hard disk drive of the mobile computer can experience operational shock.

The risk of operational shock to hard disk drives in mobile computers is known. Thus, manufacturers of mobile computers recommend that a computer be shut down or at least be put in standby mode in order to park the read/write head or heads of the hard disk drive or hard disk drives of the mobile computer. Parking the read/write head of a hard disk drive eliminates the possibility of operational shock, because the read/write head is secured away from the disk platters of the hard disk drive.

However, many users do not appreciate the risk of operational shock or forget to take time to shut down a mobile computer or to place the computer in standby mode. For example, a student having only five minutes between classes might shut the lid of a mobile computer and then immediately pick up the mobile computer in order to go to another class. Closing the lid can cause the mobile computer to begin to enter standby mode; by default, some operating systems allow a user to change this setting. Other settings for a response to closing the lid of a mobile computer can be to "shutdown," "hibernate," or "do nothing." However, except for the "do nothing" mode, entering any of these modes can take between five and sixty seconds or more, depending upon a number of factors, such as the type and quality of the mobile computer and the programs executing on the mobile computer when the lid was closed. The "do nothing" mode will allow the hard disk drive of the mobile computer to continue to operate.

Thus, if the student does not wait for the mobile computer to enter standby mode fully before picking up the computer, or if the student has set the "do nothing" mode upon lid closure, then the motion of picking up the mobile computer can jar the read/write head of the hard disk drive while the read/write head is actively reading and writing data from the hard disk drive. This event can cause operational shock. Thus, the risk of operational shock actually is increased greatly in this circumstance, despite the user's "precaution."

Similar problems occur for other users, such as professionals who have to move between closely scheduled meetings, or home users who simply do not appreciate the risk of operational shock. Even careful users can accidentally drop a mobile computer.

Mechanisms for protecting a hard disk drive of a mobile computer from operational shock are also known. For example, a mobile computer can be provided with an active protection system. An active protection system includes a motion sensor or accelerometer. The active protection system also includes software for halting the read/write head of the hard disk drive in response to a signal, or "omen," from the motion sensor or accelerometer that the mobile computer has been dropped or is being jarred. The active protection system returns the hard disk drive to operational status as soon as the signal triggering the active protection system no longer exists.

However, active protection systems do not react quickly enough to many events that can cause operational shock. For example, if a mobile computer begins to fall, the active protection system usually has enough time to halt the hard disk drive. However, if the mobile computer experiences a sudden, unexpected jarring, then the active protection system does not have enough time to halt operation of the hard disk drive.

Therefore, the best mechanism for protecting a hard disk drive from operational shock is for the user to cause the hard disk drive of the mobile computer to enter standby mode or to halt altogether. However, as described above, reliance upon the user to park or halt a hard disk drive is not optimal. Thus, it would be advantageous to have a method, apparatus, and a computer program product for parking the read/write head of a hard disk drive in a mobile computer in a manner that avoids operational shock.

BRIEF SUMMARY OF THE INVENTION

The illustrative examples provide a computer implemented method, apparatus, and computer usable program code for preventing operational shock to a hard disk drive of a mobile computer. An exemplary method includes, responsive to activation by a user of an activation device associated with the mobile computer, changing a state of the activation device. The exemplary method also includes, responsive to the change of state of the activation device, issuing a priority standby command to the hard disk drive.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
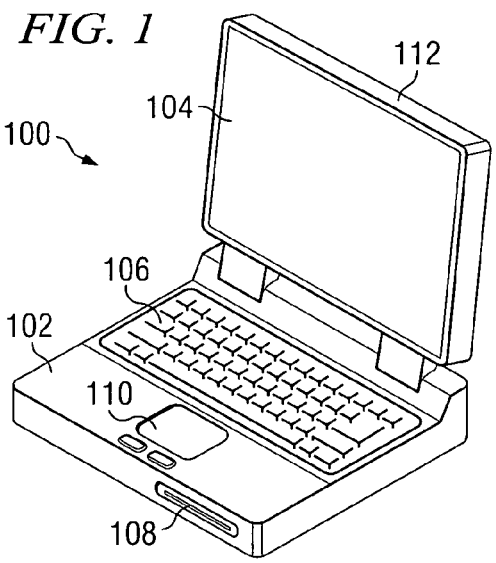
FIG. 1 is a pictorial representation of a data processing system in which illustrative embodiments may be implemented.

FIG. 1 is a pictorial representation of a data processing system in which illustrative embodiments may be implemented. Mobile computer 100, which can be a laptop computer, is depicted which includes system unit 102, video display terminal 104, keyboard 106, storage devices 108, which may include floppy drives and other types of permanent and removable storage media, and pointer device 110. Additional input devices may be included with mobile computer 100, such as, for example, a mouse, joystick, touch screen, trackball, microphone, and the like. Mobile computer 100 man be implemented using any suitable computer, such as a Thinkpad® computer, which is a product of Lenovo, located in Raleigh, N.C. Computer 100 also preferably includes a graphical user interface (GUI) that may be implemented by means of systems software residing in computer readable media in operation within computer 100.

Lid 112 can be opened and closed to protect display terminal 104 and keyboard 106. Via a switch or some other activation device, the act of closing lid 112 can cause a standby signal to be transmitted to the hard disk drive, as described further below. As a result, the act of closing lid 112 can result in the hard disk drive entering standby mode. As used herein with respect to hard disk drives, the term "standby mode" refers to a state in which any read/write heads of the hard disk drive are parked and in which any platters or disks of the hard disk drive are caused to cease spinning.

Figure 2:
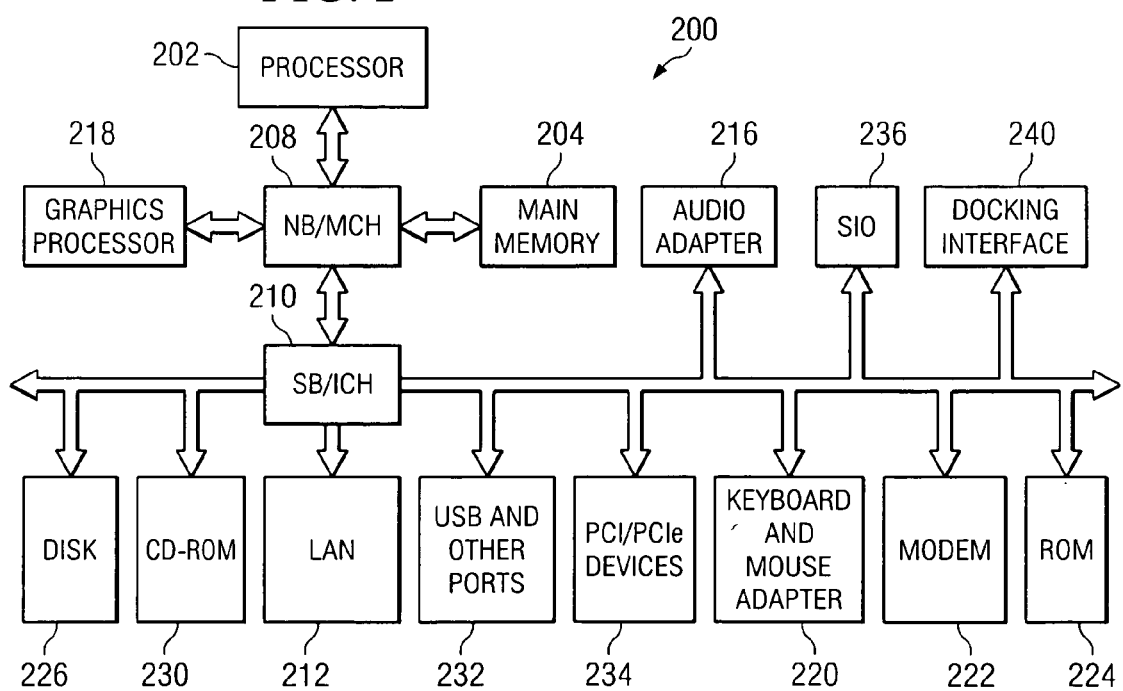
FIG. 2 is a block diagram of a data processing system in which illustrative embodiments may be implemented.

FIG. 2 is a block diagram of a data processing system in which illustrative embodiments may be implemented. Data processing system 200 is an example of a mobile computer or laptop computer, such as computer 100 in FIG. 1, in which code or instructions implementing the processes for different embodiments may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

Docking interface 240 may also be connected to the ICH. Data processing system 200 may be a mobile computing device, such as a laptop computer or handheld computer. Docking interface 240 provides port replication to allow the data processing system to easily connect to a keyboard, pointing device, monitor, printer, speakers, etc. The docking interface allows the mobile computing device to operate as a desktop computer with the more immobile peripheral devices.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202. The processes of the illustrative embodiments are performed by processor 202 using computer implemented instructions, which may be located in a memory such as, for example, main memory 204, memory 224, or in one or more peripheral devices 226 and 230.

Those of ordinary skill in the art will appreciate that the hardware in FIG. 2 may vary depending on the implementation. Other internal hardware or peripheral devices, such as flash memory, equivalent nonvolatile memory, or optical disk drives and the like, may be used in addition to or in place of the hardware depicted in FIG. 2. Also, the processes of the depicted embodiments may be applied to a multiprocessor data processing system.

For example, data processing system 200 may be a personal digital assistant (PDA), which is configured with flash memory to provide non-volatile memory for storing operating system files and/or user-generated data. The depicted example in FIG. 2 and above-described examples are not meant to imply architectural limitations. For example, data processing system 200 also may be a tablet computer, laptop computer, or telephone device in addition to taking the form of a PDA.

The illustrative examples provide a computer implemented method, apparatus, and computer usable program code for preventing operational shock to a hard disk drive of a mobile computer. An exemplary method includes, responsive to activation by a user of an activation device associated with the mobile computer, changing a state of the activation device. The exemplary method also includes, responsive to the change of state of the activation device, issuing a priority standby command to the hard disk drive. A priority standby command causes a hard disk drive to enter standby mode. As used herein with respect to hard disk drives, the term "standby mode" refers to a state in which any read/write heads of the hard disk drive are parked and in which any platters or disks of the hard disk drive are caused to cease spinning. The term "standby mode" does not necessarily refer to the term "standby mode" as used with respect to operating systems or processors of a mobile computer.

In the illustrative examples described herein, the priority standby command is a standby_immediate command. The "standby_immediate" command is the Advanced Technology Attachment (ATA) standard term for causing a hard disk drive to immediately enter standby mode regardless of whatever process the hard disk drive is taking. Another priority standby command could be the ATA "sleep" command. Other standards for operating hard disk drives can use other priority standby commands.

In any case, the priority standby command causes a hard disk drive to enter standby mode immediately regardless of the impact the standby command will have on programs executing on the mobile computer. In standby mode, the read/write head of the hard disk drive is parked and, optionally, the platter of the hard disk drive ceases to spin. For example, a standby_immediate command can cause a hard disk drive to enter standby mode in 500 milliseconds (ms) or less.

Other functions can be performed in conjunction with the standby_immediate command, so long as those other functions do not increase the time used to place the hard disk drive in standby mode. For example, the liquid crystal display (LCD) of a mobile compute or backlight can be turned off very quickly in order to save power. The combined function of the standby_immediate command and the power-off command used to cut power to the liquid crystal display can be characterized as a halt command.

Figure 3:
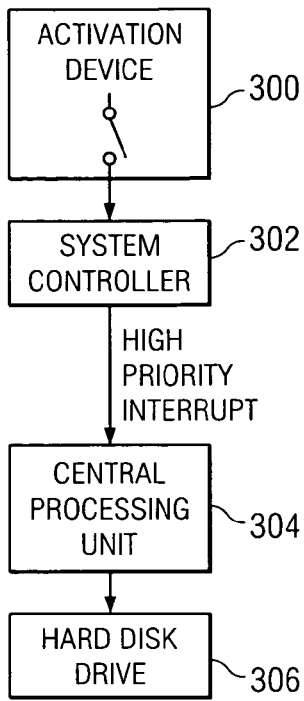
FIG. 3 is a block diagram of components used in issuing a command to a hard disk drive, in accordance with an illustrative embodiment.

FIG. 3 is a block diagram of components used in issuing a command to a hard disk drive, in accordance with an illustrative embodiment. Hard disk drive 306 can be hard disk drive 226 in FIG. 2 within a mobile computer, such as mobile computer 100 of FIG. 1 or mobile computer 200 of FIG. 2. System controller 302 can be connected to hard disk drive 306 via central processing unit 304. Central processing unit 304 can be processor 202 in FIG. 2, and can include other components of data processing system 200 in FIG. 2, such as a system controller.

Activation device 300 can be a switch associated with lid 112 of FIG. 1. The term "associated with" means that the switch is connected to the lid or the mobile computer, or is somehow able to detect the closing of the lid and communicate detection of the closing of the lid to other parts of the mobile computer. Similarly, the term "associated with" can mean that a first object is connected to or in operative relationship with a second object.

Thus, activation device 300 can be activated by closing lid 112. Activation device 300 can be other activation devices, such as a motion sensor, an accelerometer, a magnetic sensor, a combination of keystrokes on a keyboard connected to the mobile computer, or any other suitable activation device. Many types of activation devices can be associated with the lid of the mobile computer such that shutting the lid activates the activation device. An example of a combination keystrokes that can serve as an activation device is simultaneously pressing the "Alt" key and the "F4" key, such as those keys on a standard 101 computer keyboard. This keystroke combination can be referred to as an "Alt-F4" keystroke. The keyboards of most mobile computers are adapted to receive an Alt-F4 keystroke. In an illustrative example, the mobile computer is modified such that a user cannot change what function is invoked by the Alt-F4 keystroke. In another illustrative example, a user can press and hold the Alt-F4 keystroke for a predetermined period of time, such as one or more seconds, in order to place the mobile computer and hard disk drive 306 into normal standby mode. The term "normal standby mode," as used herein, means that the computer's operating system causes the computer to enter an operating system-defined standby mode, in which more than about one second is needed to cause the hard disk drive to enter "standby mode." In this illustrative example, if the Alt-F4 keystroke is pressed for less than the predetermined period of time, then the priority interrupt signal is transmitted, as described herein.

In an illustrative example, activation device 300 is activated. Software or hardware can thereafter change a state of the activation device with respect to the software or hardware. The state of an activation device can be, for example, "on" or "off;" or, "open" or "closed;" or, can be a particular keystroke.

For example, activation device 300 can be activated by a user closing the lid of the mobile computer, changing its state from "open" to "closed." The software or hardware of the mobile computer recognizes the change in state of the activation device with respect to the mobile computer.

Additionally, activation device 300 can be activated by operation of an accelerometer detecting an acceleration, a motion sensor detection motion, or a magnetic sensor detecting contact between the lid of the mobile computer and another portion of the housing of the mobile computer. A user can activate activation device 300 using a keystroke combination, as described above.

In whatever manner activation device 300 is activated or however activation device 300 change state, activation device 300 communicates an activation signal to system controller 302. In turn, system controller 302 sends a high priority interrupt signal to central processing unit 304. In turn, central processing unit 304 issues a priority standby command to hard disk drive 306. An example of a priority standby command is a standby_immediate command. In response, hard disk drive 306 immediately parks the read/write head or heads of the hard disk drive and also causes the platter or platters of the hard disk drive to cease spinning. In an illustrative example, the user is not prompted to accept standby mode for the hard disk drive; instead, standby mode occurs regardless of user input.

In this manner, an illustrative example includes receiving in a system controller connected to the mobile computer an activation signal indicative of the activation device being activated or the state of the activation device changing. The system controller issues a high priority interrupt command to a central processing unit of the mobile computer, in response to receiving the activation signal. The central processing unit issues a standby_immediate command to the hard disk drive, responsive to receiving the high priority interrupt command in the central processing unit. In this case, the standby_immediate command is the priority standby command.

Accordingly, hard disk drive 306 quickly enters a standby mode as a result of activation device 300 being activated. As stated above, the read/write head of hard disk drive 306 is parked in standby mode. While parked, the read/write head does not move or contact the surface of the platter or platters of the hard disk drive. As an optional part of standby mode, the platter or platters of the hard disk drive cease spinning or begin to cease spinning. Parking the read/write head of a hard disk drive eliminates the possibility of operational shock, because the read/write head is secured away from the disk platters of the hard disk drive.

Figure 4:
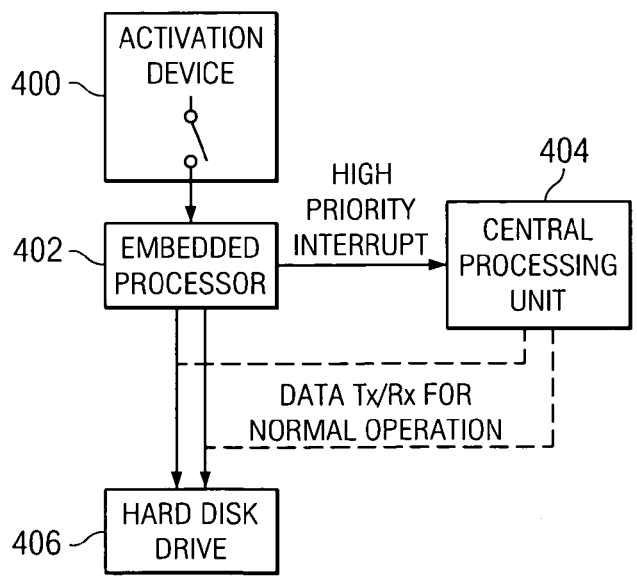
FIG. 4 is a block diagram of components used in issuing a command to a hard disk drive, in accordance with an illustrative embodiment.

FIG. 4 is a block diagram of components used in issuing a command to a hard disk drive, in accordance with an illustrative embodiment. Hard disk drive 406 can be hard disk drive 226 in FIG. 2 within a mobile computer, such as mobile computer 100 of FIG. 1 or mobile computer 200 of FIG. 2. Hard disk drive 406 corresponds to hard disk drive 306 of FIG. 3. Central processing unit 404 corresponds to central processing unit 304 of FIG. 3. A system controller, such as system controller 302 of FIG. 3, can be a part of central processing unit 404 for purposes of the illustrative embodiments described with respect to FIG. 4. The system shown in FIG. 4 is an alternative system to that shown in FIG. 3.

The system shown in FIG. 4 is similar to the system shown in FIG. 3 in that activation device 400 can be a switch associated with lid 112 of FIG. 2. Closing lid 112 can activate activation device 400. Activation device 400 can be other activation devices, such as those described with respect to FIG. 3.

However, the system shown in FIG. 4 can cause a hard disk drive to enter standby mode more quickly than the system shown in FIG. 3. In the system shown in FIG. 3, the activation signal is processed through system controller 302 and central processing unit 304 before hard disk drive 306 receives a command to enter standby mode. The time used to route these signals or commands increases the time before hard disk drive 306 enters standby mode.

In the system shown in FIG. 4, when activation device 400 is activated, activation device 400 communicates an activation signal to embedded processor 402. The activation signal indicates a change of state of the activation device, as described with respect to FIG. 3. Embedded processor 402 can be considered a second processor to central processing unit 404. Preferably, embedded processor 402 is separate and distinct from central processing unit 404.

Embedded processor 402 is configured to execute computer readable program code for issuing a priority standby command to hard disk drive 406 without first sending a high priority interrupt signal to central processing unit 404. In this illustrative example, the priority standby command is a standby_immediate command. Thus, hard disk drive 406 receives the priority standby command from embedded processor 402 almost instantly upon activation of activation device 400. In an illustrative example, the user is not prompted to accept standby mode for the hard disk drive; instead, standby mode occurs regardless of user input.

Optionally, embedded processor 402 simultaneously communicates a high priority interrupt command to central processing unit 404. Central processing unit 404 in this illustrative example can include both a system controller, such as system controller 302 in FIG. 3, and a processor, such as central processing unit 304 in FIG. 3. In this way, central processing unit 404 can process the high priority interrupt command at the same time that hard disk drive 406 receives the priority standby command. Accordingly, central processing unit 404 can take any other actions or issue any other commands that are needed or are useful in connection with causing hard disk drive 406 to enter standby mode. For example, central processing unit 404 can issue interrupt commands to currently executing software applications so that no read/write commands will be requested of hard disk drive 406.

During normal operations, data flows normally from central processing unit 404 to hard disk drive 406. Hence, in this illustrative example, embedded processor 402 only communicates signals to hard disk drive 406 in order to more quickly cause hard disk drive 406 to enter standby mode. Embedded processor 402 does not otherwise interfere with the normal operation of central processing unit 404 controlling hard disk drive 406.

Thus, an exemplary method of issuing a priority standby command can include receiving in an embedded processor, or second processor, connected to the mobile computer an activation signal indicative of the activation device being activated. The embedded processor can be distinct from the central processing unit of the mobile computer. Responsive to receiving the activation signal, the second processor issues the high priority interrupt command to the hard disk drive. Optionally, in response to receiving the activation signal in the embedded processor, the embedded processor can also issue the high priority interrupt signal to the central processing unit of the mobile computer.

Figure 5:
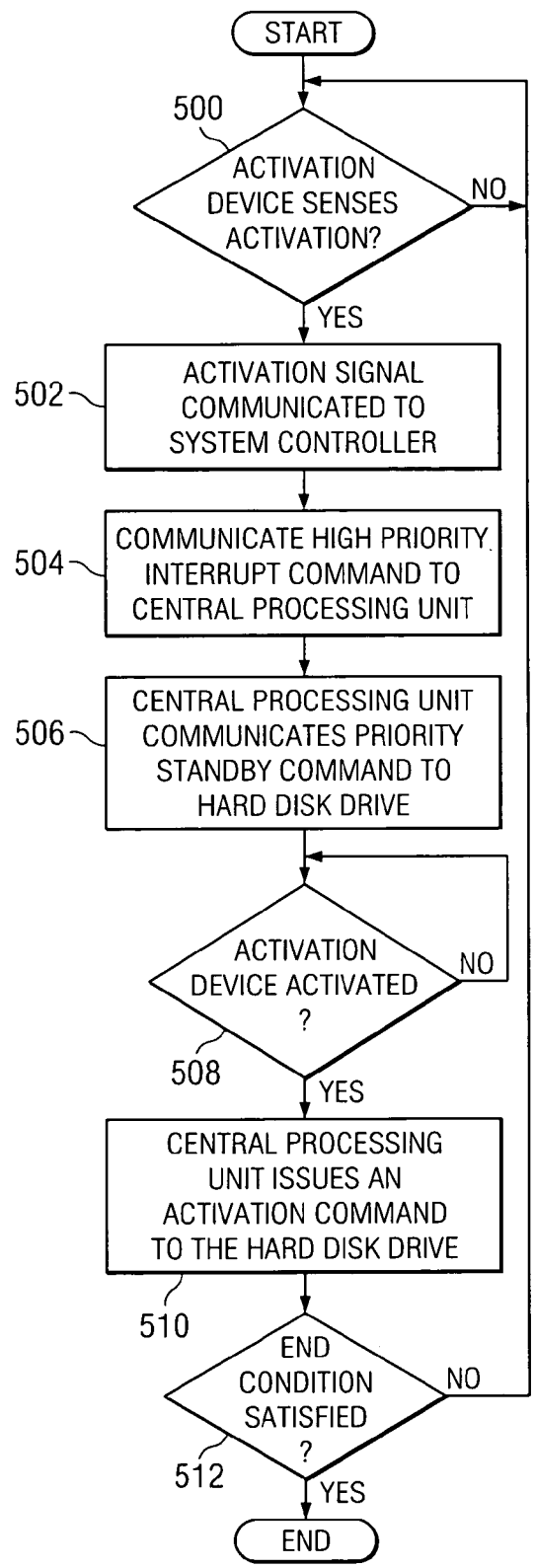
FIG. 5 is a flowchart of steps implemented in a data processing system for issuing a command to a hard disk drive, in accordance with an illustrative embodiment.

FIG. 5 is a flowchart of steps implemented in a data processing system for issuing a command to a hard disk drive, in accordance with an illustrative embodiment. The process shown in FIG. 5 can be implemented in a mobile computer, such as mobile computer 100 shown in FIG. 1 and mobile computer 200 shown in FIG. 2. Specifically, the process shown in FIG. 5 can be implemented using the system shown in either FIG. 3 or the system shown in FIG. 4. Still more particularly, the method shown in FIG. 5 can be implemented using a system controller and a central processing unit, as shown in FIG. 3, or an embedded processor, as shown in FIG. 4. As used with respect to the description of FIG. 5, the term "processor" can mean an embedded processor, a central processing unit or other processor, a system controller, or a combination of a system controller or other processor.

The process begins as the activation device senses an activation (step 500). The activation device can be activated when a user closes the lid of the mobile computer. The activation device can also sense or determine whether the lid closes by some other method or whether the activation device has been otherwise activated. If the lid is not closed (a 'no' output to step 500), then the process loops back on itself to step 500 such that the activation device continues to determine whether the user closes the lid, the activation device associated with the lid has been otherwise activated, or the activation device has been otherwise activated.

If the lid is closed or the activation device activated (a 'yes' output to step 500), the activation device communicates an activation signal to the system controller, as described with respect to FIG. 3 (step 502). In response, the system controller communicates a high priority interrupt command to the central processing unit (step 504). In response, the central processing unit communicates a priority standby command to the hard disk drive (step 506). The priority standby command can be a standby_immediate command. The priority standby command places the hard disk drive in standby mode immediately, regardless of what state the hard disk drive was in before the priority standby command was received.

Thereafter, the activation device senses or determines whether the activation device is activated (step 508). In an illustrative example, the activation device can be activated if the lid is opened. Alternatively, the activation device can sense whether the mobile computer is in a state in which the hard disk drive can be allowed to operate normally again. Alternatively, the central processing unit of the mobile computer can determine whether the mobile computer is in a state in which the hard disk drive can be allowed to operate normally again. If none of these conditions occur (a 'no' output to step 508), then the process loops back upon itself to step 508 indefinitely.

In one or more of these conditions occur (a 'yes' output to step 508), then the central processing unit senses or detects that the hard disk drive should be returned to normal operation. As a result, the central processing unit issues an activation command to the hard disk drive (step 510). The hard disk drive then resumes normal operations.

The central processing unit or system controller can then determine whether an end condition has been satisfied (step 512). An end condition can be a command to turn the mobile computer off. An end condition can also be a command to cause the computer to enter normal standby mode, as described above. If the end condition is not satisfied (a 'no' output to step 512), then the process returns to step 500 and the process repeats. If the end condition is satisfied (a 'yes' output to step 512), then the process terminates. Note that an end condition can also be determined at step 500 or step 508 in order to cause the process to terminate prematurely.

Figure 6:
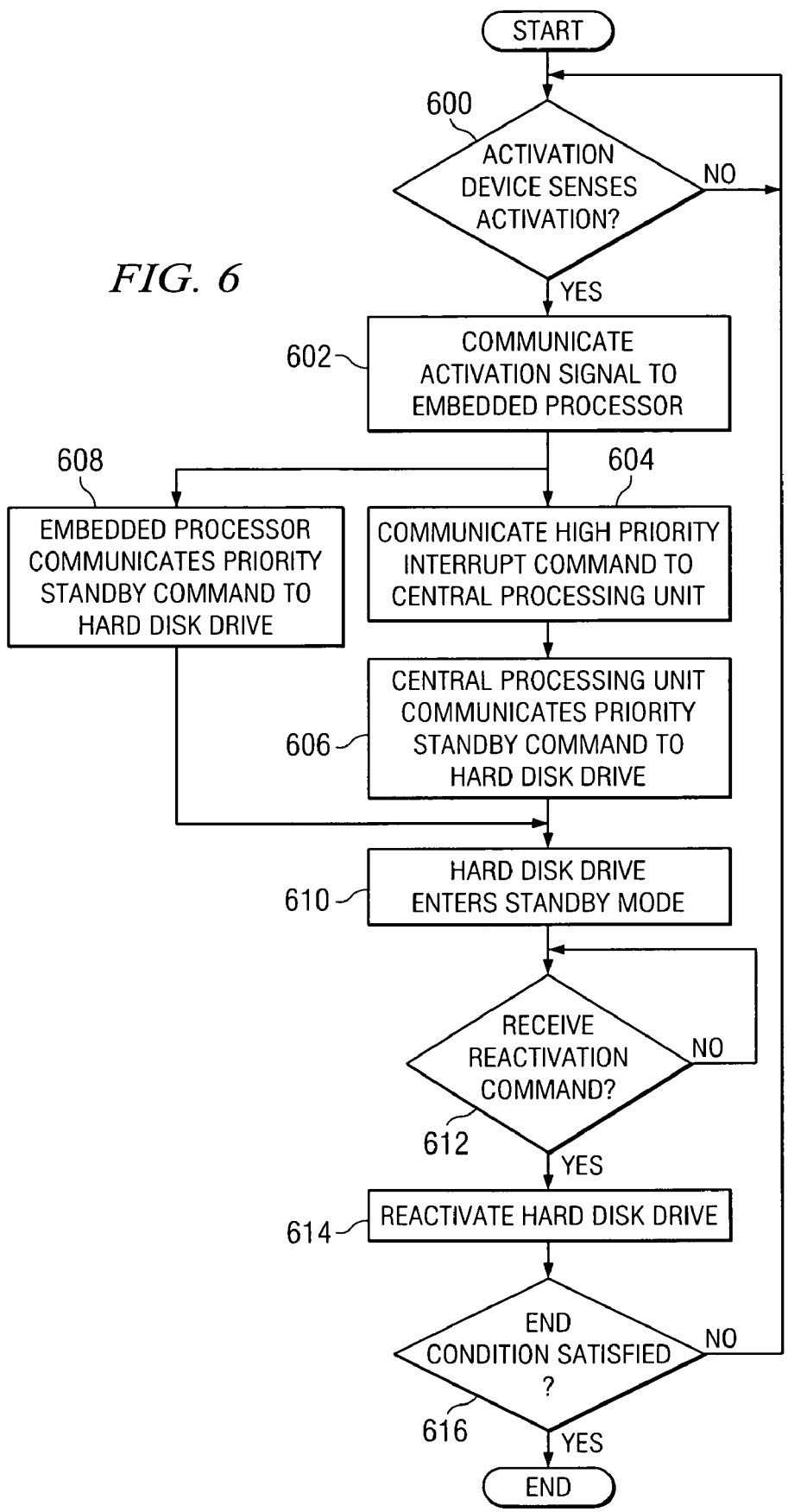
FIG. 6 is a flowchart of steps implemented in a data processing system for issuing a command to a hard disk drive, in accordance with an illustrative embodiment.

FIG. 6 is a flowchart of steps implemented in a data processing system for issuing a command to a hard disk drive, in accordance with an illustrative embodiment. The process shown in FIG. 6 can be implemented in a mobile computer, such as mobile computer 100 shown in FIG. 1 and mobile computer 200 shown in FIG. 2. Specifically, the process shown in FIG. 6 can be implemented using the system shown in FIG. 4. Still more particularly, the method shown in FIG. 6 can be implemented using a system controller and an embedded processor, as shown in FIG. 4. The method shown in FIG. 6 is an alternative method to that shown in FIG. 5.

The process begins as an activation device determines or senses an activation (step 600). If no activation occurs (a 'no' output to step 600), then the process loops back on itself at step 600, with the activation device continuing to wait to be activated. An example of an activation is the lid closing on the mobile computer. Other examples of activation are described with respect to FIG. 3 through FIG. 5, above.

Once the activation device does sense an activation (a 'yes' output to step 600), the activation device communicates an activation signal to an embedded processor in the mobile computer (step 602). Any suitable processor can serve as the embedded processor. The embedded processor is preferably separate and distinct from the other processors of the mobile computer, such as the mobile computer's central processing unit. In any case, in response to receiving the activation signal, the embedded processor communicates a priority standby signal to the hard disk drive (step 608), as described with respect to FIG. 4. An example of a priority standby signal is a standby_immediate command.

Optionally, the embedded processor can simultaneously, or soon thereafter, communicate a high priority interrupt command to the central processing unit of the mobile computer (step 604). The central processing unit of the mobile computer then communicates a priority standby command to the hard disk drive (step 606).

From either step 606 or step 608, in response to receiving the priority standby command, the hard disk drive enters standby mode (step 610). In standby mode, the read/write head of the disk drive parks. While parked, the read/write head does not contact the platter or platters of the hard disk drive. Simultaneously, the platter or platters of the hard disk drive can cease spinning while in standby mode.

In this illustrative example the hard disk drive can possibly receive two priority standby commands, one from the embedded processor in step 608 and one from the central processing unit in step 606. The central processing unit can issue the redundant command to ensure that the central processing unit does not attempt to reactivate the hard disk drive after the embedded processor issues the priority standby command. In the case where a hard disk drive receives two priority standby commands, the hard disk drive will execute the first command and ignore the later received command. No conflicts will arise.

After entering standby mode, the hard disk drive then determines whether it has received a reactivation command (step 612). A reactivation command can be issued by the embedded processor in response to an activation signal from the activation device. For example, if the user opens the lid of the mobile computer, the activation device communicates an activation signal to the embedded processor. The embedded processor, in turn, communicates a reactivation signal to the hard disk drive.

However, other techniques for issuing a reactivation command to the hard disk drive exist. For example, the central processing unit or embedded processor can communicate a reactivation signal to the hard disk drive if a user enters a particular keystroke or set of keystrokes or otherwise provides some other input to the mobile computer. In another example, the act of pressing the power button of the mobile computer can result in the reactivation command being sent to the hard disk drive.

If the hard disk drive has not received a reactivation command (a 'no' output to step 612), then the process loops back on itself at step 612 as the hard disk drive continues to wait for a reactivation command. Once the hard disk drive receives a reactivation command (a 'yes' output to step 612), the hard disk drive reactivates and begins normal operations (step 614).

Thereafter, the central processing unit of the mobile computer determines whether an end condition has been satisfied (step 616). An example of an end condition is the receipt of a command to deactivate the mobile computer. Another example of an end condition is the receipt of a command to place the computer in an operating system-defined "standby mode," which is a "normal standby mode." If the end condition is not satisfied (a 'no' output to step 616), then the process returns to step 600 and the process repeats. If the end condition is satisfied (a 'yes' output to step 616), then the process terminates.

Additional end conditions can be determined at steps 600 and 612 in order to prevent endless loops. For example, if an end condition occurs while the activation device is waiting to sense an activation at step 600, or while the hard disk drive is waiting to receive a reactivation command at step 612, then the process can terminate prematurely.

The illustrative embodiments described herein have a significant advantage over known systems for preventing operational shock. Specifically, a halt command or a standby_immediate command can be executed extremely quickly, in 500 milliseconds or less, thereby dramatically decreasing the chances that user action will lead to operational shock in the hard disk drive of a mobile computer.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of preventing operational shock to a hard disk drive of a mobile computer, the method comprising:
   responsive to activation by a user of an activation device associated with the mobile computer, changing a state of the activation device; and
   responsive to the change of state of the activation device, issuing a priority standby command to the hard disk drive, wherein issuing the priority standby command includes issuing a standby_immediate command that causes the hard disk drive to enter standby mode in 500 milliseconds or less.

2. The computer implemented method of claim 1 wherein the activation device comprises a switch associated with a lid of the mobile computer and wherein the step of changing the state of the activation device is accomplished by closing the lid.

3. The computer implemented method of claim 1 wherein the mobile computer is adapted to receive a key stroke, and wherein the step of changing the state of the activation device is accomplished by implementing the key stroke.

4. The computer implemented method of claim 1 wherein the step of issuing a priority standby command comprises issuing a halt command.

5. The computer implemented method of claim 1 wherein the step of issuing a priority standby command further comprises:
   receiving in a system controller of the mobile computer an activation signal indicative of the activation device changing state;
   responsive to receiving the activation signal, the system controller issuing a high priority interrupt command to a central processing unit of the mobile computer; and
   responsive to receiving the high priority interrupt command in the central processing unit, the central processing unit issuing the standby_immediate command to the hard disk drive, wherein the standby_immediate command is the priority standby command.

6. The computer implemented method of claim 1 wherein the step of issuing a priority standby command further comprises:
   receiving in a second processor of the mobile computer an activation signal indicative of the activation device changing state, the second processor being distinct from the central processing unit of the mobile computer; and
   responsive to receiving the activation signal, the second processor issuing the high priority interrupt command to the hard disk drive.

7. The computer implemented method of claim 6 further comprising:
   responsive to receiving the activation signal in the second processor, the second processor also issuing the high priority interrupt signal to the central processing unit of the mobile computer.

8. A computer program product, comprising computer executable instructions stored in a computer usable medium, for preventing operational shock to a hard disk drive of a mobile computer, the computer program product comprising:
   computer usable program code for, responsive to activation by a user of an activation device associated with the mobile computer, changing a state of the activation device; and
   computer usable program code for, responsive to the change of state of the activation device, issuing a priority standby command to the hard disk drive, wherein issuing the priority standby command includes issuing a standby_immediate command that causes the hard disk drive to enter standby mode in 500 milliseconds or less.

9. The computer program product of claim 8 wherein the activation device comprises a switch associated with a lid of the mobile computer and wherein changing the state of the activation device is accomplished by closing the lid of the mobile computer.

10. The computer program product of claim 8 wherein the mobile computer is adapted to receive a key stroke, and wherein changing the state of the activation device is accomplished by implementing the key stroke.

11. The computer program product of claim 8 wherein the computer usable program code for issuing a priority standby command further comprises:
    computer usable program code for receiving in a system controller of the mobile computer an activation signal indicative of the change of state of the activation device;
    computer usable program code for, responsive to receiving the activation signal, issuing a high priority interrupt command from the system controller to a central processing unit of the mobile computer; and
    computer usable program code for, responsive to receiving the high priority interrupt command in the central processing unit, issuing the standby_immediate command from the central processing unit to the hard disk drive, wherein the standby_immediate command is the priority standby command.

12. The computer program product of claim 8 wherein the computer usable program code for issuing a priority standby command further comprises:
    computer usable program code for receiving in a second processor of the mobile computer an activation signal indicative of the change of state of the activation device, the second processor being distinct from the central processing unit of the mobile computer; and
    computer usable program code for, responsive to receiving the activation signal, issuing the high priority standby command from the second processor to the hard disk drive.

13. The computer program product of claim 12 further comprising:
    computer usable program code for, responsive to receiving the activation signal in the second processor, issuing a high priority interrupt signal from the second processor to the central processing unit of the mobile computer.

14. A mobile computer comprising:
a processor;
a bus connected to the processor;
a computer usable medium connected to the bus, wherein the computer usable medium stores a set of instructions for preventing operational shock to a hard disk drive connected to the bus, wherein the processor is adapted to carry out the set of instructions to:
responsive to activation by a user of an activation device associated with the mobile computer, change a state of the activation device; and
responsive to the change of state of the activation device, issue a priority standby command to the hard disk drive, wherein issuing the priority standby command includes issuing a standby_immediate command that causes the hard disk drive to enter standby mode in 500 milliseconds or less.

15. The mobile computer of claim 14 wherein the activation device comprises a switch associated with a lid of the mobile computer and wherein the change of state of the activation device is accomplished by closing the lid of the mobile computer.

16. The mobile computer of claim 14 wherein the mobile computer is adapted to receive a key stroke, and wherein the change of state of the activation device is accomplished by implementing the key stroke.

17. The mobile computer of claim 14 wherein the processor is a central processing unit and wherein the central processing unit is further adapted to carry out the set of instructions to:
receive an activation signal, indicative of the change of state of the activation device, in a system controller connected to one of the bus and the central processing unit;
responsive to receiving the activation signal, issue a high priority interrupt command from the system controller to the central processing unit; and
responsive to receiving the high priority interrupt command in the central processing unit, issuing the standby_immediate command from the central processing unit to the hard disk drive, wherein the standby_immediate command is the priority standby command.

18. The mobile computer of claim 14 wherein the processor is a central processing unit and wherein the central processing unit is further adapted to carry out the set of instructions to:
receive an activation signal, indicative of the change of state of the activation device, in a second processor connected to the bus, the second processor being distinct from the central processing unit; and
responsive to receiving the activation signal, issue the priority standby command from the second processor to the hard disk drive.

19. The mobile computer of claim 18 wherein the central processing unit is further adapted to carry out the set of instructions to:
responsive to receiving the activation signal in the second processor, also issue a high priority interrupt signal from the second processor to the central processing unit.

* * * * *

UNITED STATES PATENT AND TRADEMARK OFFICE
CERTIFICATE OF CORRECTION

PATENT NO.        : 7,620,830 B2                                         Page 1 of 1
APPLICATION NO. : 11/479307
DATED             : November 17, 2009
INVENTOR(S)       : Adams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Twenty-sixth Day of October, 2010

David J. Kappos
*Director of the United States Patent and Trademark Office*